(12) United States Patent
Lakshminaravana et al.

(10) Patent No.: US 8,711,685 B2
(45) Date of Patent: Apr. 29, 2014

(54) SYSTEM AND METHOD FOR DATA RECONFIGURATION IN AN OPTICAL COMMUNICATION NETWORK

(75) Inventors: Ganesh Lakshminaravana, Plainsboro, NJ (US); Jayanta Das, Morganville, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 98 days.

(21) Appl. No.: 12/043,558

(22) Filed: Mar. 6, 2008

(65) Prior Publication Data

US 2008/0219157 A1    Sep. 11, 2008

Related U.S. Application Data

(60) Provisional application No. 60/893,186, filed on Mar. 6, 2007.

(51) Int. Cl.
*H04L 12/56* (2011.01)

(52) U.S. Cl.
USPC .............. 370/228; 370/335; 370/474; 398/58

(58) Field of Classification Search
None
See application file for complete search history.

(56) References Cited

U.S. PATENT DOCUMENTS

| 6,308,228 | B1 * | 10/2001 | Yocum et al. ................... 710/52 |
| 6,347,096 | B1 * | 2/2002 | Profumo et al. ............. 370/476 |
| 6,886,118 | B2 * | 4/2005 | Rose et al. .................... 714/715 |
| 7,031,343 | B1 * | 4/2006 | Kuo et al. ..................... 370/473 |
| 7,535,930 | B2 * | 5/2009 | Lim et al. ..................... 370/474 |
| 7,542,482 | B2 * | 6/2009 | Casaccia et al. ............. 370/473 |
| 7,610,608 | B2 * | 10/2009 | Kim et al. ..................... 725/119 |
| 7,653,864 | B2 * | 1/2010 | Schroeder ..................... 714/776 |
| 7,675,936 | B2 * | 3/2010 | Mizutani et al. ............. 370/466 |
| 2003/0039249 | A1 * | 2/2003 | Basso et al. .................... 370/394 |
| 2003/0219015 | A1 * | 11/2003 | Constant Six et al. ........ 370/389 |
| 2004/0210669 | A1 * | 10/2004 | Lee ............... 709/236 |
| 2005/0286517 | A1 * | 12/2005 | Babbar et al. ................. 370/389 |
| 2009/0162055 | A1 * | 6/2009 | Sakamoto et al. .............. 398/35 |

* cited by examiner

*Primary Examiner* — Robert Scheibel
(74) *Attorney, Agent, or Firm* — Kaplan Breyer Schwarz & Ottesen, LLP

(57) ABSTRACT

A system and method for optical communication are disclosed that may include providing an optical network terminal (ONT) operable to transmit information over a passive optical network (PON) to an optical line terminal (OLT); transmitting gigabit encapsulation mode (GEM) frames from the ONT to the OLT; converting the GEM frames into IP fragments; and transmitting the IP fragments out of the OLT.

3 Claims, 3 Drawing Sheets

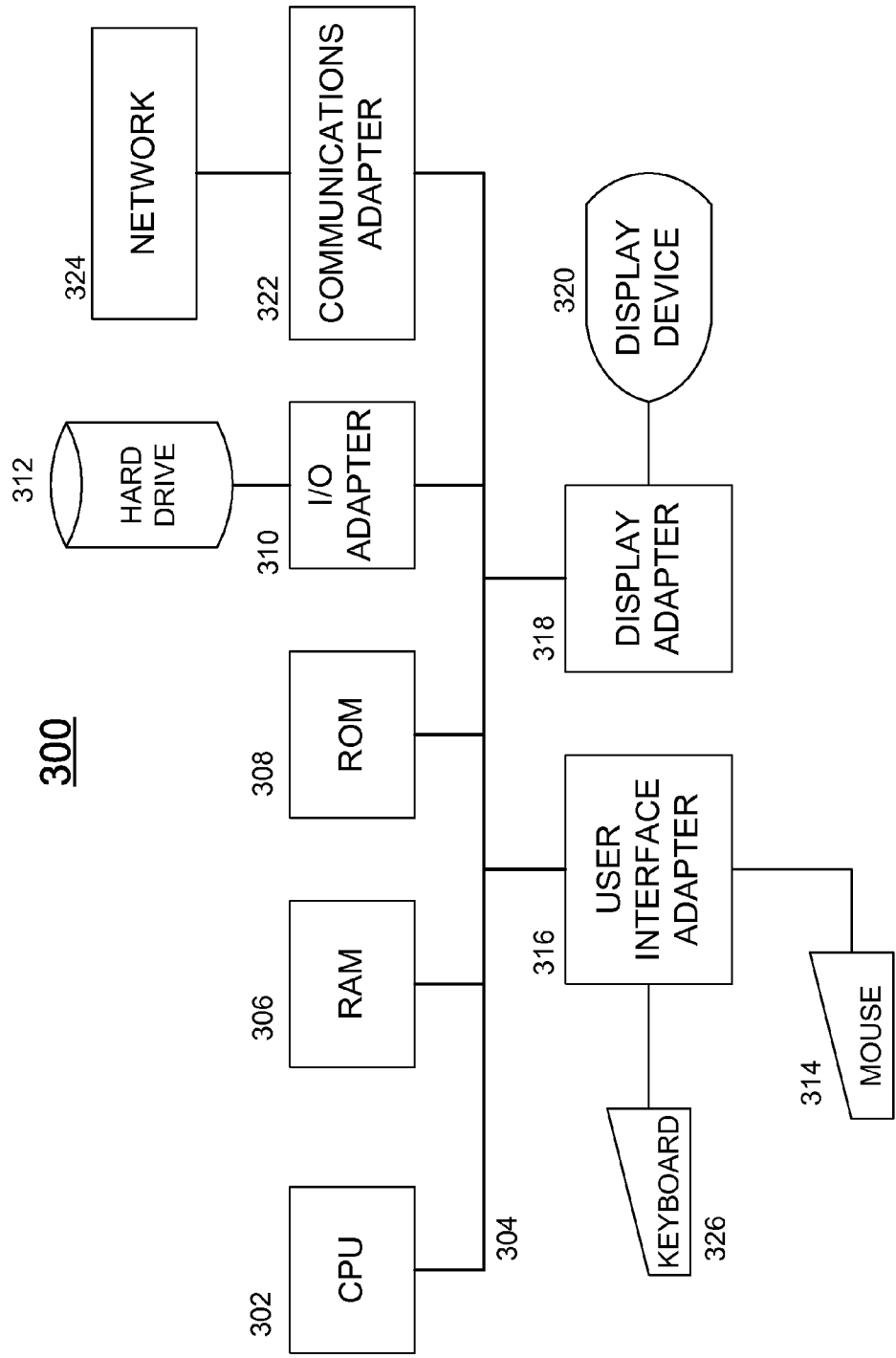

SYSTEM AND METHOD FOR DATA RECONFIGURATION IN AN OPTICAL COMMUNICATION NETWORK

CROSS-REFERENCE TO RELATED APPLICATIONS

This application claims the benefit of U.S. Provisional Patent Application Ser. No. 60/893,186, filed Mar. 6, 2007, entitled "System and Method for Data Reconfiguration in an Optical Communication Network", the entire disclosure of which is incorporated herein by reference.

BACKGROUND OF THE INVENTION

The Gigabit Passive Optical Network (GPON) system is organized in the following manner. Optical network terminals (ONTs) are located closest to the end users of the network and transmit information to and from the user into a Passive Optical Network (PON) link. On the other side of the PON link is an optical line terminal (OLT), which aggregates the data from several different ONTs (typically 32 per PON link), and possibly multiple PON links, and sends the data on into the core network.

Typically, the computers/devices connected to the ONT transmit Ethernet/IP packets, meaning that the level 2 protocol is Ethernet protocol and the level 3 protocol is Internet Protocol (IP). Therefore, the ONT ultimately receives and sends Ethernet packets. The amount of data an ONT can send in a given time frame is fixed by the OLT through a process called bandwidth allocation. In order to efficiently utilize the allocated bandwidth, the ONT fragments the Ethernet packets it receives, and wraps them into G-PON Encapsulation Mode (GEM) frames. Each GEM frame can contain a full Ethernet packet, multiple Ethernet packets, partial Ethernet packets, or any combination of the above. Therefore, the GEM frames are launched into the PON link. These frames are decoded by the OLT at the other end of the PON link, and Ethernet fragments are extracted from these GEM frames and are re-assembled at the OLT.

GEM is a method for encapsulating data over a GPON. Although any type of data can be encapsulated, the data types to be encapsulated depend on the service situation. GEM provides connection-oriented communication as well as Asynchronous Transfer Mode (ATM) communication. The concept and framing format may be similar to Generic Framing Procedure (GFP).

FIG. 1 shows how this fragmentation can induce network congestion. FIG. 1 shows a PON link over which ONT1 transmits fragments of three Ethernet packets in its time slot E1, F1, and G1, where the number represents the fragment number and the letters denote different Ethernet packets. In general, this can happen if E, F, and G belong to different traffic classes (the OLT allocates bandwidth separately to different classes of traffic). When these fragments are transmitted, ONT1's transmission window runs out. Therefore, these fragments cannot be transmitted by the OLT into the network, and thus remain in the memory until the final fragments of these three Ethernet packets arrive. This happens at time T2, when ONT1 begins transmitting again and sends fragments 2 of E, F, and G, labeled E2, F2, and G2, respectively. Now, the OLT has three packets to transmit within a relatively short window, and wasted transmission time in the previous window, waiting for the fragments to arrive. Therefore, fragmentation and reassembly can induce congestion in an otherwise smooth stream of traffic.

A second issue is the hardware associated with reassembly. Clearly, the OLT needs to store the Ethernet fragments in a memory. When new fragments arrive, the OLT must find out whether the Ethernet fragments form a complete packet and, if so, pass the packet on through the network. As with any buffer based solution, we need to be concerned about buffer overflows that can result from an ONT reset/missed or lost packets. All of these cases create a substantial implementation overhead for the ONT. Thus, there is a need in the art for an improved system and method for communication in optical networks.

SUMMARY OF THE INVENTION

According to one aspect, the invention is directed to a system and method that will reduce upstream data congestion and simplify the implementation of the GPON protocol in the upstream direction (the direction corresponding to data transmission from the network users to the carrier) Users can decompose Ethernet frames into GPON protocol units, called GEM fragments, and transmit them upstream. One Ethernet frame can potentially span several GEM frames. GEM frames are reassembled into Ethernet frames at the OLT (optical line terminal) and transmitted onwards, to the final destination.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a block diagram of a computer system useable in conjunction with an embodiment of the invention.

DETAILED DESCRIPTION OF THE PREFERRED EMBODIMENTS

Figure 1:
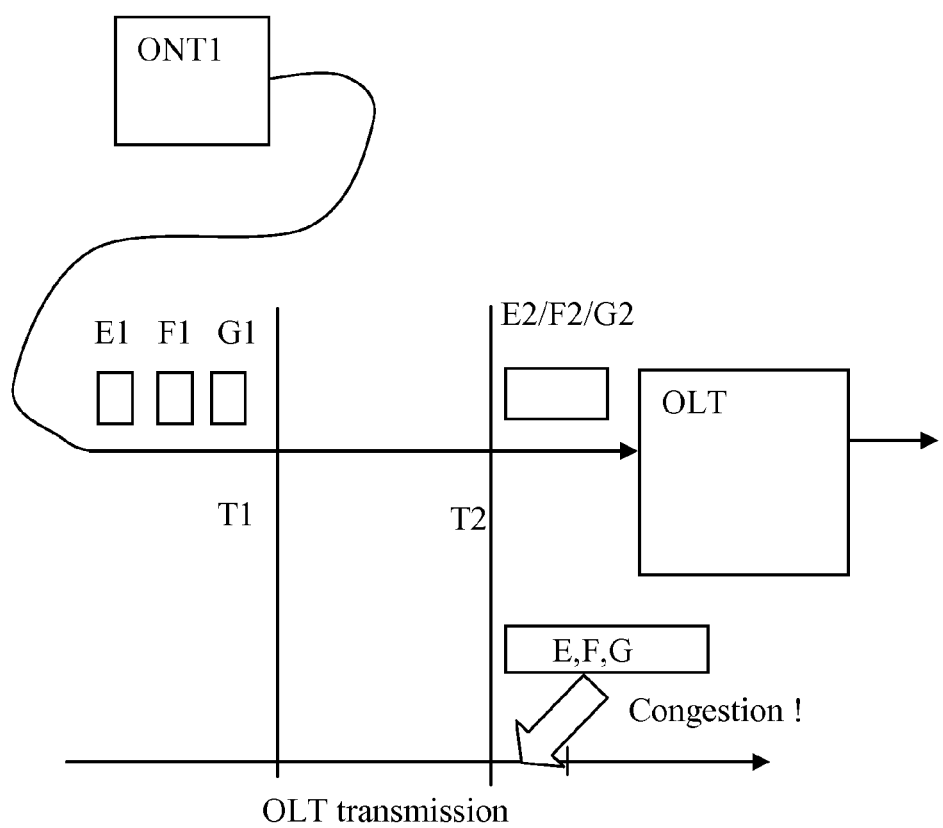
FIG. 1 is a block diagram of a communication network.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Gigabit passive optical networks (GPONs) are a promising last-mile option, and have the potential to deliver high-speed services to the home and office over optical fiber. We propose a system and method that will reduce upstream data congestion and simplify the implementation of the GPON protocol in the upstream direction (the direction corresponding to data transmission from the network users to the carrier). Users can decompose Ethernet frames into GPON protocol units, called GEM fragments, and transmit them upstream. One Ethernet frame can potentially span several GEM frames. GEM frames are reassembled into Ethernet frames at the OLT (optical line terminal) and transmitted onwards, to the final destination. We propose a scheme in which the Ethernet data extracted from the GEM fragments are each encapsulated into separate Ethernet frames and separate IP (Internet Protocol) fragments. Since the IP protocol supports (and indeed encourages) reassembly at the target, the IP fragments are sent into the network.

Therefore, the OLT does not have to wait for all GEM fragments to come in before sending data into the network. GEM fragments are preferably encapsulated into IP fragments as they arrive at the OLT. This provides smooth traffic flow because the OLT does not have to wait for a complete Ethernet packet to arrive before transmitting data into the network. In addition, upstream logic does not have to be maintained for performing reassembly. The above-described system and method preferably results in a much simpler logical implementation that avoids the need for reassembly logic.

In one embodiment, the present invention may include converting GEM fragments into valid Ethernet packets and valid IP fragments. These packets and/or fragments are then transmitted upon receipt, thereby preferably eliminating the need for a reassembly buffer or complex reassembly logic. This approach also preferably avoids data traffic congestion by more efficiently employing the available data transmission period or window.

In the following section, we outline our procedure to create valid IP packets from Ethernet fragments. As discussed above, an Ethernet packet can span several GEM frames. The Structure of a Gem Frame that Begins an IP Packet is Preferably as Follows:

| 1. | GEM header |
|---|---|
|   | a. ID |
|   | b. Last/not last |
| 2. | Ethernet header |
| 3. | IP Header |
| 4. | Data |

Subsequent Frames Preferably have the Following Structure:

| 1. | GEM header |
|---|---|
|   | a. ID |
|   | b. Last/not last |
| 2. | Data |

From the "last/not last" indication in the GEM header, we can identify whether a given frame is the last of a sequence or not.

The primary data structure that we maintain may be a table, indexed by GEM ID, that contains the Ethernet and IP fragments, and an entry called "Current_Frag_Offset", which maintains the number of bytes of a given IP packet that have been transmitted. This is beneficial for setting the "Frag_offset" field of an IP packet that identifies the exact byte position in the IP packet at which a given fragment fits in.

Therefore, a method in accordance with one embodiment of the invention is listed below. The invention is not limited to the specific order of steps listed below. Moreover, selected steps may be omitted where beneficial for a particular application.

1. When a GEM frame arrives, find out if it is the first frame of a sequence. This can be done by simply checking the ID (every frame has a unique ID)
2. If the GEM frame is the first frame of an IP Packet:
    a. If a GEM frame is a first frame, recover and store the Ethernet and IP headers in a table indexed by the ID of the GEM frame.
    b. Modify the GEM frame as follows:
        i. Change the IP header to indicate that the IP packet is fragmented.
        ii. Change the IP packet length in the IP header to the length of the data fragment. The data fragment's length is computed as the difference between the GEM frame and the point where IP data begins.
        iii. Modify the length of the Ethernet frame to be the total length of the Ethernet fragment embedded in the GEM frame.
        iv. Recompute the Ethernet Cyclic Redundancy Check (CRC).
        v. Send the packet on.

The contents and order of the above list of steps may be varied as needed for a given application.

3. If the GEM frame is not the first frame of the IP Packet:
    a. Look up the Ethernet and IP headers under the GEM frame ID.
    b. Modify the GEM frame as follows.
        i. The Ethernet packet length is set to length of the Ethernet fragment embedded in the GEM packet.
        ii. The length of the IP packet is set to the length of the IP fragment embedded in the GEM packet.
        iii. The IP fragment offset is set copied from the "Current_Fragment_Offset" entry in the table.
        iv. The Entry for "Current_Fragment_Offset" in the table is incremented by a number equal to the length of the embedded IP fragment.

Figure 2:
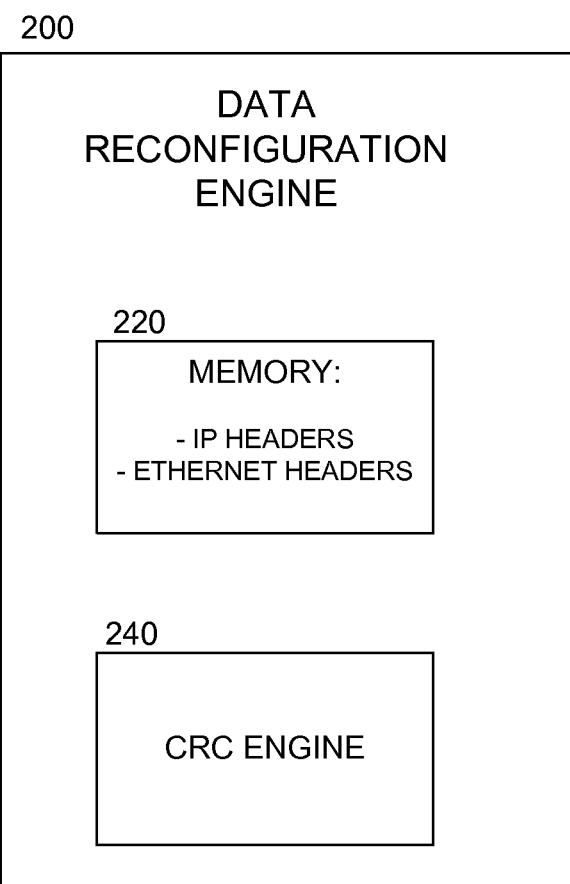
FIG. 2 is a block diagram of a data reconfiguration engine in accordance with an embodiment of the present invention.

With reference to FIG. 2, hardware for implementing the above method may include a data reconfiguration engine 200 which may include a memory 220 that stores the IP and Ethernet headers, and/or a CRC engine 240 that can recompute the CRC of the modified Ethernet fragment. Both of these elements are relatively simple, and add up to a substantially less complex solution than a full upstream reassembly engine. In addition, retransmission of data upon receipt thereof preferably provides a smoother and better regulated flow of data traffic. Data reconfiguration engine 200 may be placed in communication with the Optical Line Terminal, or OLT, of FIG. 1. Alternatively, engine, or processor, 200 may be placed in communication with one or more other components within an optical communication network (in addition to, or in place of the OLT). Data reconfiguration engine 200 may be any suitable computing device having one or more processors, one or more data storage devices, and/or one or more communication links internal to engine 200 and to devices external to engine 200 for conducting data communication therewith.

Above, we present a technique to improve traffic flow and simplify hardware implementation of an upstream GPON link. Our technique is based on the observation that fragmentation and reassembly are (i) complex to implement, and (ii) can lead to holes and bursts in transmission, thereby creating turbulent and potentially congested traffic flow, as opposed to the smooth flow desired for the GPON protocol. Therefore, we propose a scheme that creates valid IP/Ethernet packets from GEM fragments and that enables data to be retransmitted without a significant need for data buffering and without significant delay, as experienced in the prior art. The disclosed system and method preferably avoids potential congestion issues and is also simple to implement.

FIG. 3 is a block diagram of a computing system 300 adaptable for use with one or more embodiments of the present invention. In one or more embodiments, central processing unit (CPU) 302 may be coupled to bus 304. In addition, bus 304 may be coupled to random access memory (RAM) 306, read only memory (ROM) 308, input/output (I/O) adapter 310, communications adapter 322, user interface adapter 316, and display adapter 318.

In one or more embodiments, RAM 306 and/or ROM 308 may hold user data, system data, and/or programs. I/O adapter 310 may connect storage devices, such as hard drive 312, a CD-ROM (not shown), or other mass storage device to computing system 300. Communications adapter 322 may couple computing system 300 to a local, wide-area, or Internet network 324. User interface adapter 316 may couple user input devices, such as keyboard 326 and/or pointing device 314, to computing system 300. Moreover, display adapter 318 may be driven by CPU 302 to control the display on display device 320. CPU 302 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for converting GEM frames into valid IP packets at an Optical Line Terminal (OLT), the method comprising:
   receiving a GEM frame including a data fragment at the OLT;
   if the received GEM: frame is a first frame of an IP packet, recovering the Ethernet and IP headers of the frame;
   storing the recovered header information in a data table in a memory in a data reconfiguration engine at the OLT;
   adjusting the IP header information to indicate that the IP packet is fragmented using the data reconfiguration engine;
   modifying an indication of a length of the IP packet in the IP header to match a length of the data fragment in the received GEM frame;
   recomputing an Ethernet cyclic redundancy check (CRC) using a CRC engine within the data reconfiguration engine; and
   sending the IP packet into the core network.

2. A method for converting GEM frames into valid IP packets, the method comprising:
   if a GEM frame is not the first frame of an IP packet, looking up the Ethernet and IP headers under the ID of the GEM frame in a data table in a memory within a data reconfiguration engine;
   setting a length of an Ethernet packet of the GEM frame to the length of an Ethernet fragment embedded in the GEM frame;
   setting a length of an IP packet to the length of an IP fragment embedded in the GEM frame; and
   setting an IP fragment offset according to the value of a current_Fragment_Offset entry in the data table.

3. The method of claim 2 further comprising:
   incrementing the "Current_Fragment_Offset" value in the data table by a number equal to the length of the IP fragment embedded in the GEM frame.

* * * * *